United States Patent
Sanji et al.

(10) Patent No.: US 8,456,056 B2
(45) Date of Patent: Jun. 4, 2013

(54) ROTOR CORE FOR ROTATING ELECTRIC MACHINE

(75) Inventors: Hiroaki Sanji, Takahama (JP); Yasuo Yamaguchi, Kariya (JP)

(73) Assignee: Aisin AW Co., Ltd., Anjo (JP)

( * ) Notice: Subject to any disclaimer, the term of this patent is extended or adjusted under 35 U.S.C. 154(b) by 79 days.

(21) Appl. No.: 13/295,676

(22) Filed: Nov. 14, 2011

(65) Prior Publication Data
US 2012/0126658 A1    May 24, 2012

(30) Foreign Application Priority Data
Nov. 18, 2010 (JP) ................................. 2010-258353

(51) Int. Cl.
    *H02K 1/22*      (2006.01)

(52) U.S. Cl.
    USPC ........ 310/216.048; 310/216.009; 310/216.135

(58) Field of Classification Search
    USPC .................... 310/216.008, 216.009, 216.048, 310/216.057–216.059, 216.135
    See application file for complete search history.

(56) References Cited

U.S. PATENT DOCUMENTS

| | | | | |
|---|---|---|---|---|
| 5,075,150 A | * | 12/1991 | Webb et al. | ............ 428/162 |
| 5,338,996 A | * | 8/1994 | Yamamoto | ............ 310/216.048 |
| 5,894,182 A | * | 4/1999 | Saban et al. | ........... 310/216.048 |
| 5,992,003 A | * | 11/1999 | Elliott et al. | .................... 29/596 |
| 7,915,780 B2 | * | 3/2011 | Tsumagari | ............ 310/216.044 |
| 2008/0252166 A1 | | 10/2008 | Shiga et al. | |

FOREIGN PATENT DOCUMENTS

| JP | A-2002-262496 | 9/2002 |
|---|---|---|
| JP | B2-3848804 | 11/2006 |
| JP | A-2009-005449 | 1/2009 |
| JP | A-2009-118704 | 5/2009 |
| JP | A-2009-273202 | 11/2009 |
| JP | A-2010-142114 | 6/2010 |

OTHER PUBLICATIONS

Feb. 14, 2012 International Search Report issued in PCT/JP2011/076094 (with translation).

* cited by examiner

*Primary Examiner* — Dang Le
(74) *Attorney, Agent, or Firm* — Oliff & Berridge, PLC

(57) ABSTRACT

A rotor core for a rotary electric machine includes a plurality of ring-shaped core plates. The core plates are formed by joining arc-shaped segments. The core plate segments each include a protruding portion that is formed on one surface of each of the segments and has an end in the circumferential direction that is arc-shaped, and a recessed portion that is formed on the other surface and has an end in the circumferential direction that is arc-shaped, and to which the protruding portion of the core plate segment of another layer is fitted when the core plates are laminated. An interference fit is provided between the protruding portion width of the core plates and the recessed portion of the core plates in the radial direction and a loose fit is provided in the circumferential direction.

1 Claim, 7 Drawing Sheets

ROTOR CORE FOR ROTATING ELECTRIC MACHINE

INCORPORATION BY REFERENCE

The disclosure of Japanese Patent Application No. 2010-258353 filed on Nov. 18, 2010 including the specification, drawings and abstract is incorporated herein by reference in its entirety.

BACKGROUND OF THE INVENTION

The present invention relates to a rotor core for a rotary electric machine, in which a plurality of core plates is laminated to each other, and more specifically, relates to a fastening structure thereof.

DESCRIPTION OF THE RELATED ART

A generally known rotor core for a rotary electric machine is formed by laminating core plates, each of which is formed by punching out an electromagnetic steel plate, on each other in order to reduce the occurrence of an eddy current. According to related art, in a rotor core (rotor iron core 8) in which such a plurality of core plates (punched iron core plates 9) is laminated to each other, circular fastening portions 16 are formed in the core plates 9 by punching, and the laminated core plates are fastened to each other through dowel fastening (for example, refer to Japanese Patent Application Publication No. JP-A-2010-142114).

SUMMARY OF THE INVENTION

Forming a rotor core by laminating core plates to each other as described in Japanese Patent Application Publication No. JP-A-2010-142114 requires a plurality of core plates. If the shape of each core plate is a ring shape, each core plate is punched out from the base material in a ring shape, and therefore a center portion of the ring shape cannot be used, resulting in low yield. For this reason, each core plate is divided into a plurality of core plate segments. The core plate segments are joined to each other to form one core plate, and such core plates are laminated to each other so that phases (circumferential positions) of seams between core plate segments are displaced from each other (in a manner of so-called bricklaying) to form the rotor core (refer to Japanese Patent Application Publication No. JP-A-2002-262496).

Forming the rotor core by laminating the core plate segments on each other in the manner of bricklaying described above and fastening the core plates to each other through dowel fastening can achieve high yield and allow the configuration of the rotor core to be maintained as a single body.

BRIEF DESCRIPTION OF THE DRAWINGS

However, if the core plates above are formed by joining the core plate segments, a strong stress is produced in the fastening portions along a circumferential direction of the core plates, based on centrifugal forces acting on respective core plate segments of each layer when the rotor core rotates.

In addition, a residual tensile stress is produced over the entire circumference of the circular fastening portions due to their being fastened to each other. Therefore, both the residual tensile stress and the stress based on centrifugal forces act on a section of each fastening portion subjected to the stress produced based on centrifugal forces.

Figure 1:
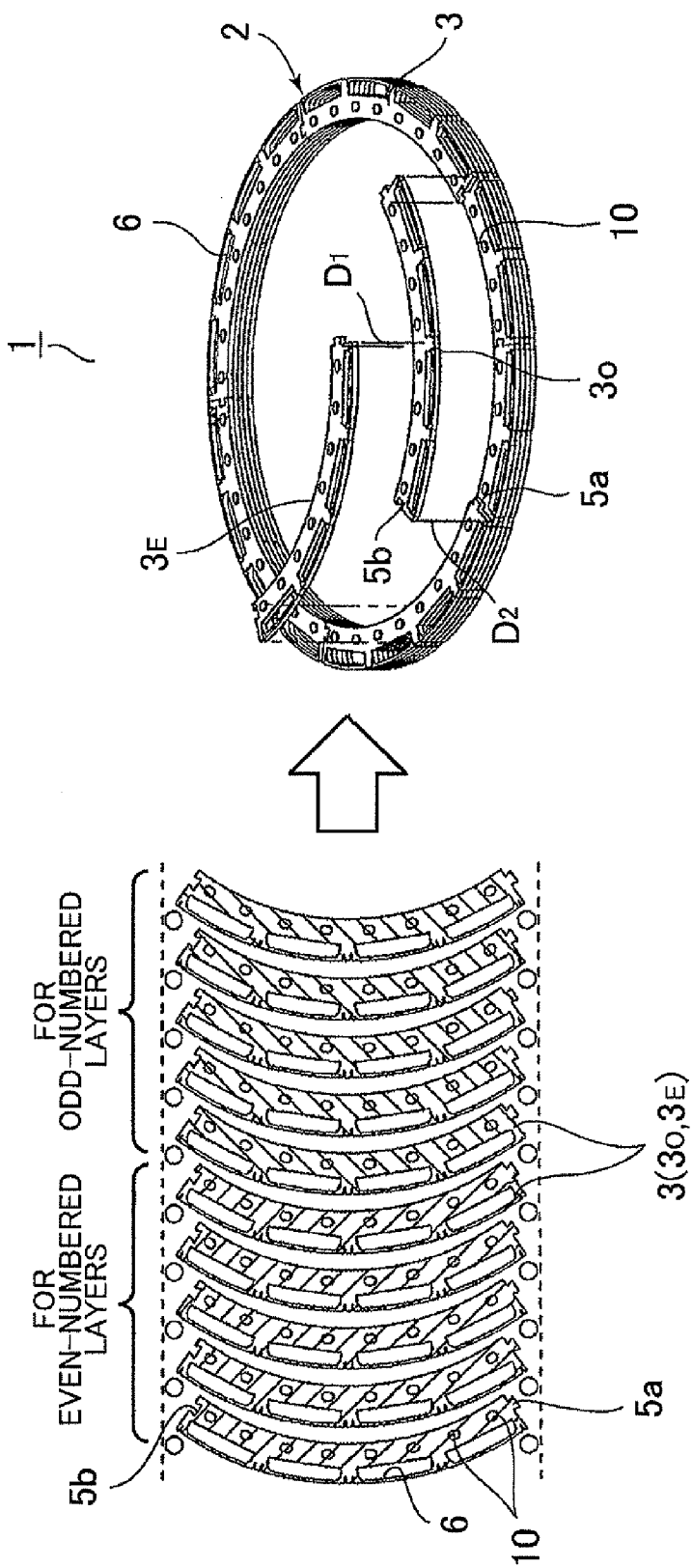

Therefore, in order to maintain the rotation strength of the rotor core at a required strength, the fastening portions described above must have more strength compared to fastening portions in a rotor core formed by undivided core plates. In order to improve the strength of the fastening portions, areas subjected to the stress based on centrifugal forces described above and the residual stress may be enlarged so as to receive these stresses in a dispersed manner. However, if a diameter of the circular fastening portions is increased, a width of the rotor core in a radial direction also needs to be increased. This enlarges the rotor core, and also worsens the yield as a consequence.

On the other hand, if the areas subjected to the stress based on centrifugal forces and the residual stress are enlarged by increasing the thickness of the rotor core, the eddy current generated also increases, and this lowers the efficiency of the rotary electric machine.

In consideration of the above, it is an object of the present invention to provide a rotor core that solves the problems described above by separating in each fastening portion a section that receives stress based on centrifugal forces from a section in which residual stress is produced.

According to an aspect of the present invention, a rotor core for a rotary electric machine includes a plurality of ring-shaped core plates that are laminated to each other to form the rotor core. In the rotor core, a layer of each of the core plates is formed by joining arc-shaped core plate segments formed by evenly dividing the core plate, and a position of a seam between the core plate segments in a circumferential direction differs in a laminating direction of the core plates for each layer of at least one of the core plates. The core plate segments each include a protruding portion that is formed on one surface of each of the core plate segments and has an end portion in the circumferential direction that is arc-shaped, and a recessed portion that is formed on the other surface and has an end portion in the circumferential direction that is arc-shaped, and to which the protruding portion of the core plate segment of another layer is fitted when the core plates are laminated. Further, a width of the protruding portion in a radial direction of the core plates is larger than a width of the recessed portion in the radial direction of the core plates to fit the protruding portion into the recessed portion through an interference fit in the radial direction, and a width of the protruding portion in the circumferential direction of the core plates is smaller than a width of the recessed portion in the circumferential direction of the core plates to fit the protruding portion into the recessed portion in the circumferential direction through a loose fit with a clearance that is eliminated when the protruding portion and the recessed portion are brought in contact with each other as the rotor core rotates.

According to the aspect of the present invention, the protruding portion and the recessed portion of the each core plate segment are fitted to each other through an interference fit in the radial direction of the core plates, and this allows the core plates to be fastened to each other at the sections subjected to the interference fit. The protruding portion and the recessed portion described above are fitted to each other through a loose fit at the sections on which a large stress acts as a result of the core plate segments attempting to move in a separating direction from each other due to centrifugal forces when the rotor core rotates, and this fastening can prevent occurrence of a residual tensile stress. Further, when the rotor core rotates, a clearance between the loose-fitted sections is eliminated and end portions of the arc-shaped protruding portion and recessed portion in the circumferential direction are brought in contact with each other. Therefore, the stress based on centrifugal forces can be received in sections of the protruding portion and the recessed portion in which the residual stress is not produced, without concentration of the stress based on centrifugal forces. This improves the strength of the fastening portions, and makes it possible to achieve a required rotation strength with a configuration that is compact in the radial direction even in the rotor core with the divided core plates. Further, because the thickness of each core plate can be made thinner, an eddy current generated in the rotor core can be kept small. Accordingly, it is possible to form a rotary electric machine with high yield and good efficiency using the rotor core described above.

BRIEF DESCRIPTION OF THE DRAWINGS

Figure 2:
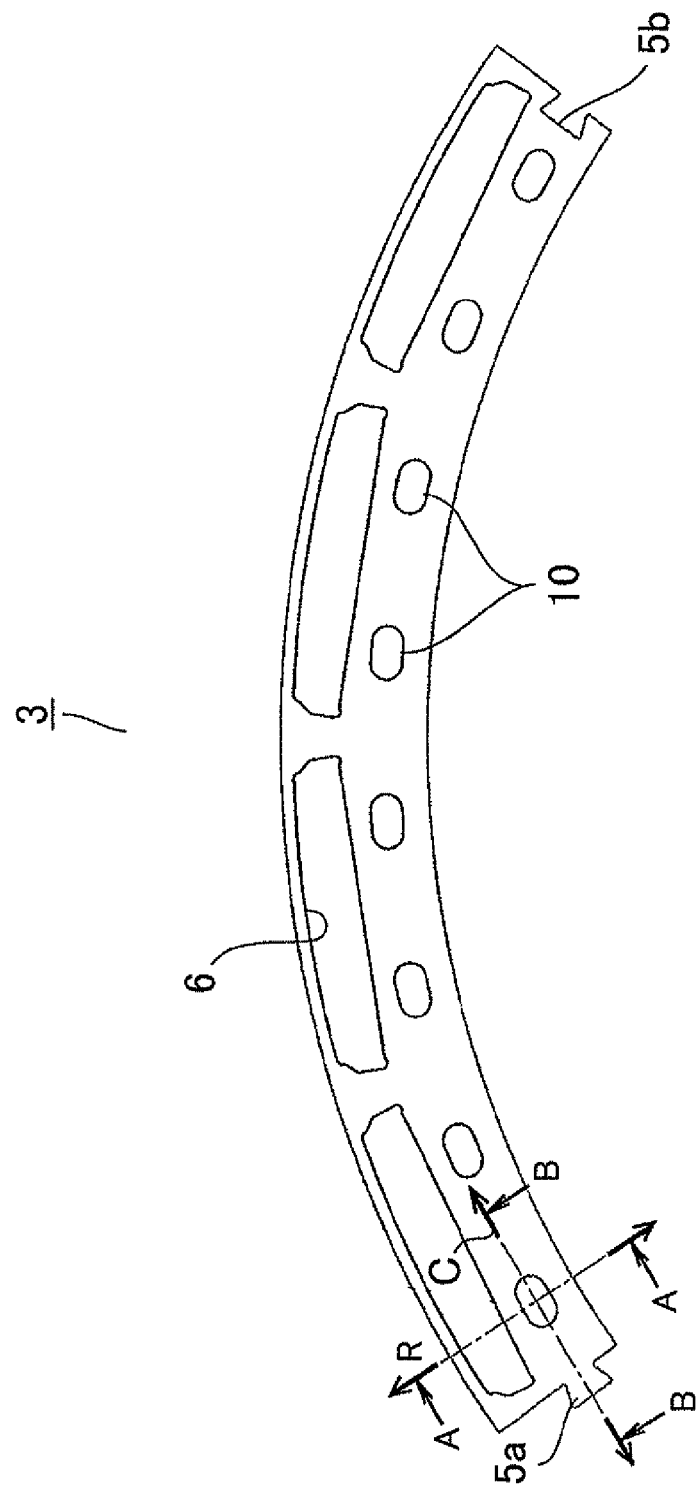
Figure 3A:
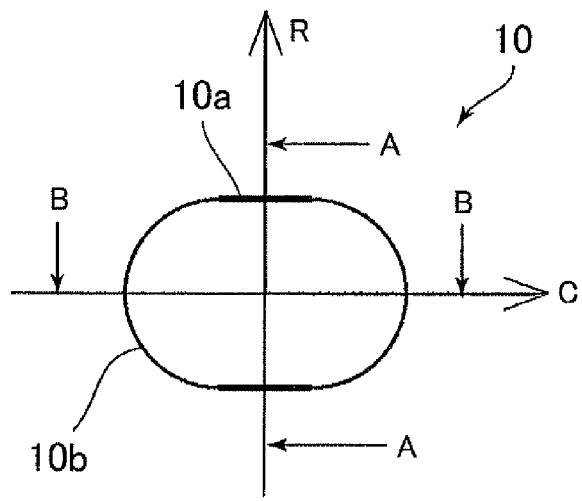
Figure 3B:
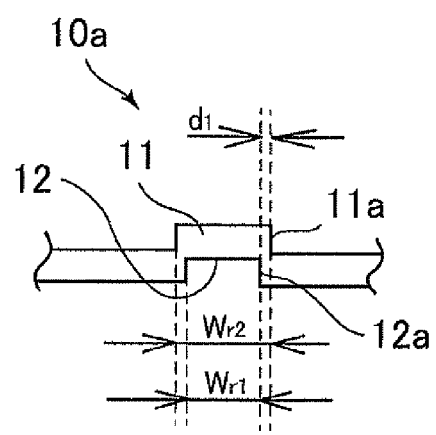
Figure 3C:
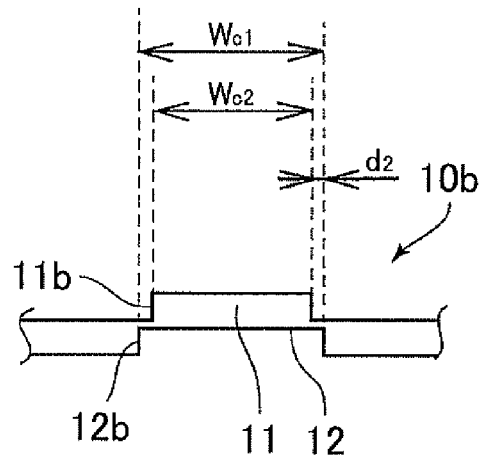
Figure 4A:
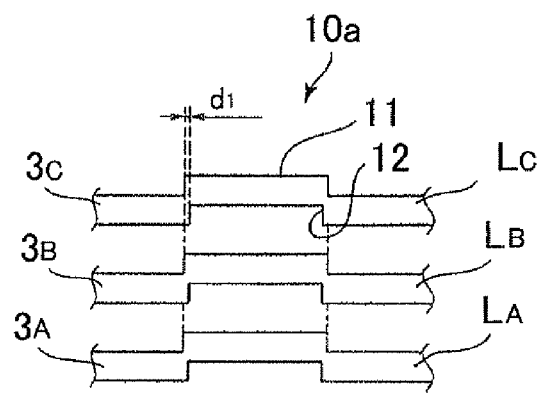
Figure 4B:
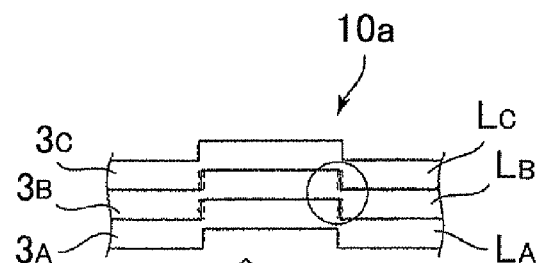
Figure 4C:
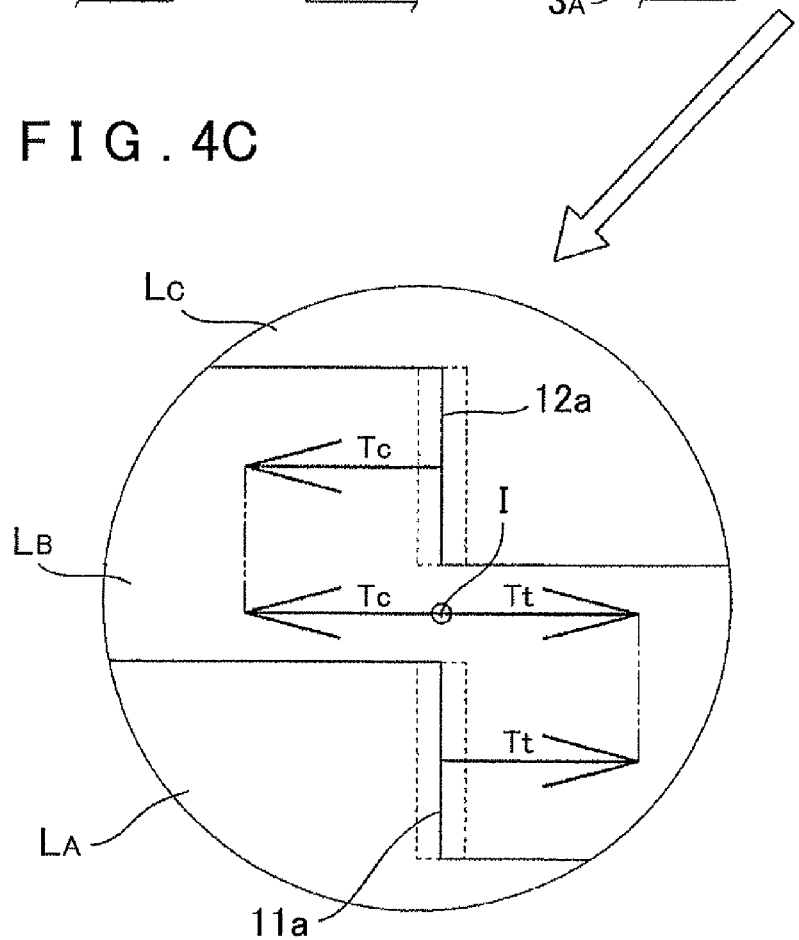
Figure 5B:
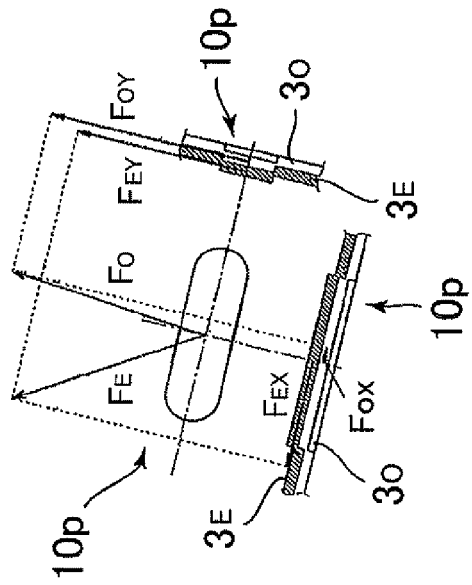
Figure 5A:
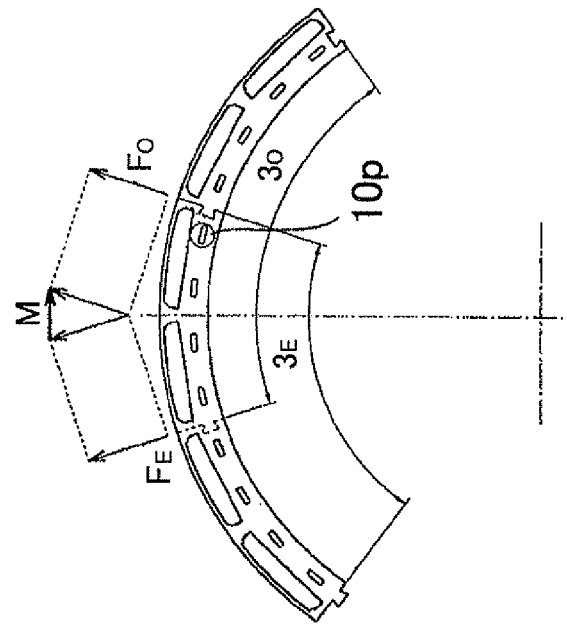
Figure 6A:
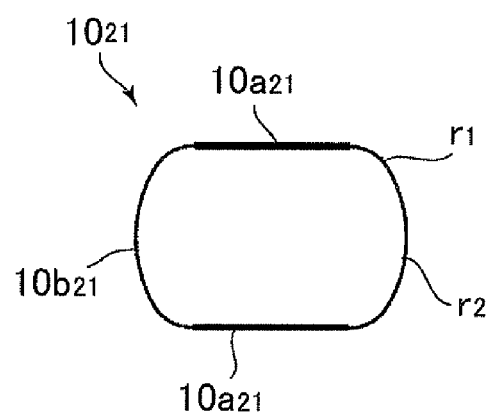
Figure 6B:
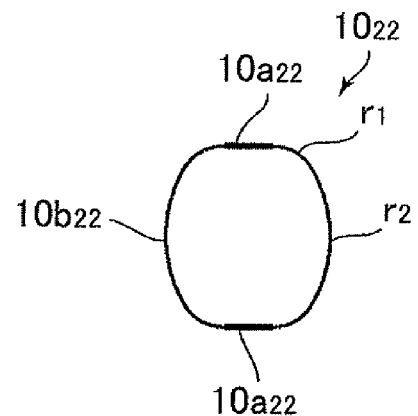
Figure 7A:
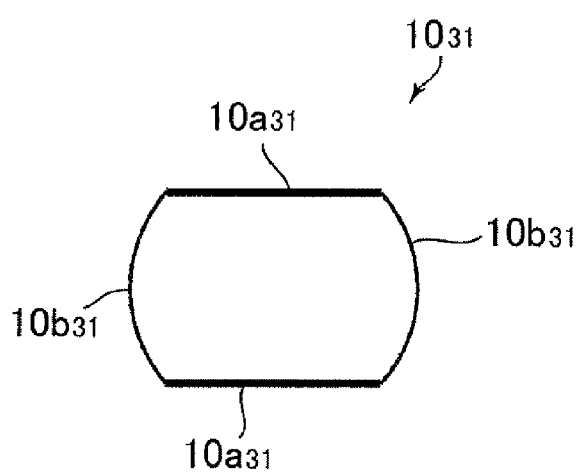
Figure 7B:
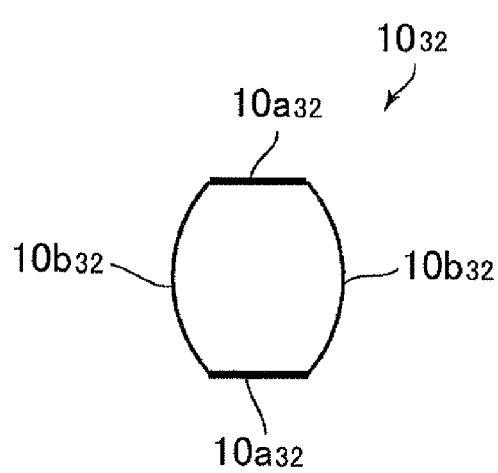

FIG. 1 is a schematic diagram that shows a rotor core according to a first embodiment of the present invention;

FIG. 2 is a schematic diagram that shows a core plate segment according to the first embodiment of the present invention;

FIGS. 3A to 3C show schematic diagrams for explaining the configuration of a fastening portion according to the first embodiment of the present invention, where FIG. 3A is a plan view of the fastening portion, FIG. 3B is a cross-sectional view of the fastening portion taken along a line A-A, and FIG. 3C is a cross-sectional view of the fastening portion taken along a line B-B;

FIGS. 4A to 4C show schematic diagrams for explaining a residual stress produced in the fastening portions of the core plate segments according to the first embodiment of the present invention, where FIG. 4A is a diagram that shows a state before laminating the core plate segments, FIG. 4B is a diagram that shows a state after laminating the core plate segments, and FIG. 4C is an enlarged view of a main portion of FIG. 4B;

FIGS. 5A and 5B show schematic diagrams for explaining a stress based on centrifugal forces, which act on the fastening portions of the core plate segments according to the first embodiment of the present invention, where FIG. 5A is a schematic diagram for explaining the centrifugal forces acting on the core plate segments of different layers, and FIG. 5B is an enlarged view of a main portion of FIG. 5A;

FIG. 6A is a schematic diagram for explaining the configuration of a fastening portion according to a second embodiment of the present invention, and FIG. 6B is a modification example of FIG. 6A; and FIG. 7A is a schematic diagram for explaining the configuration of a fastening portion according to a third embodiment of the present invention, and FIG. 7B is a modification example of FIG. 7A.

DETAILED DESCRIPTION OF THE EMBODIMENTS

A rotor core for a rotary electric machine according to embodiments of the present invention will be described with reference to the drawings. It should be noted that, in the description below, an interference fit refers to a fitting between a protruding portion and a recessed portion with a width of the protruding portion slightly wider than a width of the recessed portion, and a loose fit refers to a fitting between a protruding portion and a recessed portion with a predetermined clearance interposed therebetween.

[First Embodiment]

As shown in FIGS. 1 and 2, a rotor core 1 for an IPM motor (rotary electric machine) is formed by laminating a plurality of ring-shaped core plates 2. Each of the core plates 2 is a plate-shaped member that is punched out from a base material of an electromagnetic steel plate. In order to improve yield, the core plates 2 are each formed by joining arc-shaped core plate segments 3 that are formed by evenly dividing the core plate 2 (in the present embodiment, by dividing the core plate 2 into five core plate segments 3).

More specifically, one end portion of each core plate segment 3 is formed with a protruding portion 5a. The other end portion of each core plate segment 3 is formed with a fitted portion 5b. The protruding portion 5a of the core plate segment 3 is fitted to the fitted portion 5b of another core plate segment 3 adjacent in a circumferential direction so that the core plate segment 3 is joined to the circumferentially adjacent core plate segment 3. Seams $D_1$, $D_2$ at which the core plate segments 3 are joined, that is, joints between the protruding portions 5a and the fitted portions 5b, are formed so that the number of joints is the same as the number of core plate segments 3 in one core plate 2.

The core plate 2 of any layer is formed in a ring shape by joining the core plate segments 3 that all have the same shape. The core plates 2 are laminated in a manner of bricklaying in which the positions (phases) of the seams $D_1$, $D_2$ between the core plate segments 3 in a circumferential direction C are displaced from each other with respect to the adjacent core plate 2 in a laminating direction. That is, the positions of the seams $D_1$, $D_2$ between the core plate segments 3 in the circumferential direction C differ between the core plates that are adjacent to each other in the laminating direction. For example, in FIG. 1, the core plates 2 are divided into odd-numbered layer core plates 2 and even-numbered layer core plates 2 by counting the laminated core plates 2 from the bottom of the rotor core 1, for convenience. In this case, core segments $3_E$ in the even-numbered layers are disposed so that the positions of the seams $D_1$ in the circumferential direction C are displaced by a predetermined angle from the seams $D_2$ between core plate segments $3_O$ in the odd-numbered layers.

Further, each of the core plate segments 3 is formed with a plurality of magnet insertion holes 6 into which rare-earth permanent magnets, such as neodymium magnets, are inserted, and a plurality of fastening portions 10 by which the plurality of core plates 2 laminated to each other is fastened. The magnet insertion holes 6 and the fastening portions 10 are formed in the circumferential direction of the core plate segment 3. The fastening portions 10 are respectively provided on inner circumferential sides of both end portions of each magnet insertion hole 6. The fastening portions 10 are fastened after temporarily assembling the core plates 2 so that the overall configuration of the core plates 2 in the rotor core 1 can be maintained without falling apart.

Next, the fastening portions 10 described above will be explained in detail. As shown in FIGS. 2 and 3, the fastening portions 10 each include a protruding portion (dowel) 11 that is formed by protruding one surface of the core plate segment by pressing, and a recessed portion 12 that is formed by formation of the protruding portion 11. The recessed portion 12 is formed on the surface (other surface) of the core plate segment 3 opposite the surface from which the protruding portion 11 protrudes. The fastening portions 10 are dowel-fastened by fitting the protruding portion 11 into the recessed portion 12 of another core plate segment 3.

Two types of stresses, that is, a residual stress produced when fastening and a stress based on centrifugal forces acting when the rotor core 1 rotates, act on the fastening portions 10 that are each formed of the protruding portion 11 and the recessed portion 12.

The residual stress is a stress that is produced by fastening the fastening portions 10 through an interference fit. Core plate segments $3_A$, $3_B$, $3_C$ in an A layer $L_A$, a B layer $L_B$, and a C layer $L_C$ that are laminated to each other as shown in FIGS. 4A to 4C are used herein as an example. The fastening portions 10 are each formed so that, in a section 10a to be subjected to an interference fit, a width $W_{r2}$ of the protruding portion 11 is larger by an interference $d_1$ than a width $W_{r1}$ of the recessed portion 12 (see FIG. 4A).

As shown in FIG. 4B, the core plate segments $3_A$, $3_B$, $3_C$ are joined in the laminating direction thereof through an interference fit in which the protruding portions 11 are press-fitted into the recessed portions 12 having a width smaller by the interference $d_1$ than that of the protruding portions 11. Likewise, the core plate segment $3_B$ shown in FIG. 4C, when the protruding portion 11 of the B layer $L_B$ is press-fitted into the recessed portion 12 of the core plate segment $3_C$ of another layer (the C layer $L_C$), the press-fitted protruding portion 11 of the B layer $L_B$ receives a stress Tc in a compressing direction from a wall portion 12a of the recessed portion 12 of the C layer $L_C$ (that is, in the direction of the protruding portion 11 of the B layer $L_B$ from the recessed portion of the C layer $L_C$).

Meanwhile, when the protruding portion of still another layer (the A layer $L_A$) is press-fitted into the recessed portion 12 of the B layer $L_B$, that recessed portion 12 of the B layer $L_B$ receives a stress Tt in an expanding direction from a wall portion 11a of the protruding portion 11 of the A layer $L_A$ (that is, in the direction of the recessed portion 12 of the B layer $L_B$ from the protruding portion 11 of the A layer $L_A$). The stresses Tc, Tt that act in opposite directions to each other act on a joint portion I in the B layer $L_B$ at which the protruding portion 11 of the A layer $L_A$ and the recessed portion 12 of the B layer $L_B$ are joined, and the stress Tc from the recessed portion side and the stress Tt from the protruding portion side are balanced, whereby the residual tensile stress described above is produced in the joint portion I.

The stress based on centrifugal forces is a stress produced in the fastening portions 10 as the rotor core 1 rotates. When the rotor core 1 rotates, as shown in FIG. 5A, centrifugal forces $F_E$, $F_O$ respectively act on the stacked core plate segments $3_E$, $3_O$.

The centrifugal forces $F_E$, $F_O$ acting on the stacked core plate segments $3_E$, $3_O$ are divided into components $F_{EX}$, $F_{OX}$ in the circumferential direction of the core plate segments $3_E$, $3_O$ and components $F_{EY}$, $F_{OY}$ in the radial direction of the core plate segments $3_E$, $3_O$ as shown in FIG. 5B. The radial components $F_{EY}$, $F_{OY}$ both act in a direction from a center of the core plates 2 toward an outer diameter side, and therefore a reaction force cannot be mutually received between the stacked core plate segments $3_E$, $3_O$. Accordingly, almost no force acts on the fastening portions 10 that join the core plate segments $3_E$, $3_O$ of the different layers.

On the other hand, the circumferential component $F_{EX}$ of the centrifugal force $F_E$ and the circumferential component $F_{OX}$ of the centrifugal force $F_O$ act in different directions from each other between the stacked core plate segments $3_E$, $3_O$. Therefore, the reaction force can be mutually received at the fastening portions 10 that join the core plate segments $3_E$, $3_O$. That is, when focusing on a fastening portion $10_P$ formed at an end portion of the core plate segment $3_E$, the stacked core plates attempt to move in opposite directions to each other along the circumferential direction, and this causes the stress based on centrifugal forces to be produced in the fastening portion $10_P$ in the circumferential direction of the core plate 2. It should be noted that a force of the radial components $F_{EY}$, $F_{OY}$ of the centrifugal forces $F_E$, $F_O$ is received by the fastening portions of the entire core plate 2 in a dispersed manner.

However, a large force acts on the fastening portions in the vicinity of the seams $D_1$, $D_2$ of the core plate segments 3 in particular.

The fastening portion 10 according to the present embodiment, which is shown in FIGS. 3A to 3C described above, is configured so that the stress based on centrifugal forces and the residual tensile stress are not produced at the same location. The section 10a subjected to an interference fit, in which the residual stress described above is produced, is formed separate from a section 10b in which the stress based on centrifugal forces is produced.

Specifically, the fastening portion 10 includes linear portions 10a and arc portions 10b. In each of the linear portions 10a, the wall portion 11a of the protruding portion 11 and the wall portion 12a of the recessed portion 12 in the circumferential direction C of the core plate 2 (a tangential direction of the core plate segment 3) are linearly formed. In each of the arc portions 10b, a wall portion 11b of the protruding portion 11 and a wall portion 12b of the recessed portion 12 in a radial direction R of the core plate 2 are formed curved at a predetermined curvature. The fastening portion 10 has an oval shape that is formed by connecting between corresponding ends of the linear portions 10a by the corresponding one of the arc portions 10b, and the linear portions 10a serve as sections of the fastening portion 10 that are subjected to an interference fit.

That is, in the fastening portion 10, the width $W_{r2}$ of the protruding portion 11 in the radial direction R of the core plate 2, which is the width between the linear wall portions 11a, 11a, is set larger than the width $W_{r1}$ of the recessed portion 12 in the radial direction R of the core plate 2, which is the width between the linear wall portions 12a, 12a ($W_{r2} > W_{r1}$), and the protruding portion 11 and the recessed portion 12 are fitted to each other in the radial direction R through an interference fit.

Further, the stress based on the centrifugal forces $F_E$, $F_O$ acts on the fastening portion 10 in the circumferential direction thereof, and therefore, the arc portions 10b) serving as circumferential end portions of the protruding portion 11 and the recessed portion 12 are subjected to a loose fit, with a predetermined clearance $d_2$ interposed between the arc-shaped wall portions 11b, 12b. That is, the arc portions 10 form sections of the fastening portion 10 that are subjected to a loose fit. A width $W_{c2}$ of the protruding portion 11 in the circumferential direction C of the core plate 2, which corresponds to the width between the arc-shaped wall portions 11b, 11b, is set smaller than a width $W_{c1}$ of the recessed portion 12 in the circumferential direction of the core plate 2, which corresponds to the width between the arc-shaped wall portions 12b, 12b ($W_{c1} > W_{c2}$).

It should be noted that, when fastening the fastening portions 10, in each of the arc portions 10b, the clearance $d_2$ is provided between the arc-shaped wall portion 11b of the protruding portion and the arc-shaped wall portion 12b of the recessed portion 12. Therefore, the reaction forces against the circumferential components $F_{EX}$, $F_{OX}$ of the centrifugal forces $F_E$, $F_O$ cannot be received between the wall portions 11b, 12b. The clearance $d_2$ is set, however, so as to allow the arc-shaped wall portion 11b of the protruding portion 11 and the arc-shaped wall portion 12b of the recessed portion 12 to be brought in contact with each other due to minute displacement between, and elastic deformation of, the core plate segments $3_E$, $3_O$, when the rotor core 1 rotates and the stacked core plate segments $3_E$, $3_O$ attempt to move in the circumferential direction so as to separate from each other. In other words, the clearance $d_2$ is set so that the protruding portion 11 and the recessed portion 12 are brought in contact with each other when the rotor core 1 rotates.

Next, the operation of the rotor core 1 according to the first embodiment of the present invention will be described. As shown in FIG. 1, to fabricate the rotor core 1, the operator assembles each of the core plates 2 by setting the core plate segments 3 in a retainer (not shown) in a ring shape, and laminates the plurality of core plates to each other. During this process, because the retainer is rotated by a predetermined angle for every core plate layer, the core plates 2 are laminated so that the positions of the seams $D_1$, $D_2$ of the core plate segments 3 in the circumferential direction C are displaced between the core plates 2 adjacent in the laminating direction. In addition, before laminating the next layer of the core plate 2, the laminated core plates 2 are dowel-fastened by pressing, thereby joining the laminated core plates 2 in the laminating direction. Then, a prescribed number of fastened core plates 2 are further laminated to form the rotor core 1.

That is, when the temporarily assembled core plates 2 are pressed, the linear portions $10a$ of the fastening portions 10 are fitted to each other through an interference fit, and the core plate segments 3 are joined in the laminating direction. One rotor core 1 is formed by such a plurality of core plates 2 laminated to each other. The operator then respectively inserts neodymium magnets into the magnet insertion holes 6 of the rotor core 1 so as to cause the rotor core 1 to function as a rotor, and a rotary electric machine is formed by integrating such a rotor.

When electricity is supplied to the rotary electric machine and the rotor rotates, centrifugal forces in accordance with a rotation speed of the rotor act on each of the core plate segments 3 of the rotor core 1. When such centrifugal forces act, as shown in FIGS. 5A and 5B, the core plate segments 3 attempt to move in a direction in which the stacked core plate segments $3_O$, $3_E$ separate from each other in the circumferential direction C of the core plate 2 (for example, in a direction M shown in the drawing in the case of the core plate segment $3_E$). Then, in each of the fastening portions 10 at which the stacked core plates $3_O$, $3_E$ are joined, the clearance $d_2$ between the wall portions $11b$, $12b$ of the arc portion $10b$, which has been subjected to a loose fit, is eliminated by circumferential displacement or elastic deformation of the core plates segments $3_O$, $3_E$ of the core plates segments $3_O$, $3_E$. The force of the circumferential components of the centrifugal forces acting on the fastening portion 10 is received by the arc-shaped wall portions $11b$, $12b$ brought in contact with each other.

As described above, the centrifugal forces acting on the fastening portion 10 are received by the arc-shaped wall portions $11b$, $12b$ brought in contact with each other, and thus the fastening portion 10 can endure a large stress (centrifugal force) because the stress is not concentrated thereon. Further, the fastening portions 10 are fitted through an interference fit in the radial direction, and the arc portions $10b$ that receive the stress produced based on centrifugal forces are subjected to a loose fit. With this configuration, the residual tensile stress due to the interference fit is not produced in the arc portions $10b$, whereby it is possible for the fastening portions 10 to endure an even larger centrifugal force.

Furthermore, the section that is subjected to an interference fit is configured by the linear portion $10a$ that linearly extends in the tangential direction of the core plate segment 3. This makes it possible for the linear portion thus configured to evenly receive the residual stress due to the interference fit, and also makes it easier to displace the stacked core plate segments $3_O$, $3_E$ in the circumferential direction. Moreover, the section that receives the stress based on centrifugal forces is separated from the section in which the residual stress is produced. The fastening portions can thus endure a larger centrifugal force, thereby improving the rotation strength of the rotor core 1.

This makes it possible, in the rotor core 1 with the divided core plates 2 as well, to achieve a required rotation strength with a configuration that is compact in the radial direction. Further, because the thickness of each of the core plates 2 can be made thinner, an eddy current generated in the rotor core 1 can be kept small, whereby a rotary electric machine with high yield and good efficiency can be formed using the rotor core 1 described above.

[Second Embodiment]

Next, a second embodiment of the present invention will be described. It should be noted that in the second embodiment, the configuration of the fastening portions according to the first embodiment is modified. Therefore, the descriptions of the configurations common to both the first and the second embodiments will be omitted, and the parts having the same operation and effect as these in the first embodiment will be denoted by the same names used in the first embodiment.

As shown in FIG. 6A, in each fastening portion $10_{21}$ according to the second embodiment, arc portions $10b_{21}$ are each formed by arcs with two curvatures $r_1$, $r_2$, so that the curvature $r_1$ of the arc in a portion connecting to a linear portion $10a_{21}$ is configured to be larger than the curvature $r_2$ of the arc in a center portion that mainly receives the stress based on centrifugal forces ($r_1 > r_2$).

As described above, by decreasing the curvature $r_2$ of the arc in the center portion that mainly receives the stress based on centrifugal forces, the stress concentration on the arc portion $10b_{21}$ can be reduced. Further, if the curvature $r_1$ of the arc in the connecting portion is set larger than the curvature $r_2$ of the arc in the center portion, the linear portion $10a_{21}$ can be formed elongated, and thus the elongated linear portion $10a_{21}$ can receive the residual stress due to the interference fit in a dispersed manner.

[Third Embodiment]

Next, a third embodiment of the present invention will be described. In the third embodiment, the configuration of the fastening portion is different from that in the first embodiment. The descriptions of configurations common to both the first embodiment and the third embodiment will be omitted, and the parts having the same operation and effect as these in the first embodiment will be denoted by the same names used in the first embodiment.

As shown in FIG. 7A, in each fastening portion $10_{31}$ according to the third embodiment, arc portions $10b_{31}$ are each configured by a single large arc with a small curvature. The arc portions $10b_{31}$ are each configured so as not to extend in the tangential direction of the core plate segment 3, and linear portions $10a_{31}$ are thus formed elongated.

As described above, the arc with a small curvature receives the stress based on centrifugal forces, and this makes it possible to reduce the stress concentrations on the arc portions $10b_{31}$. Further, forming the linear portions $10a_{31}$ elongated makes it possible for the residual stress based on the interference fit to be received by the elongated linear portions $10a_{31}$ in a dispersed manner.

It should be noted that, in the first to third embodiments, a circumferential length of the fastening portion 10 is configured to be longer than a radial length. However, as shown in FIGS. 6B and 7B, the radial length may be formed longer than the circumferential length.

Further, a number of the fastening portions 10 are formed in the core plate segments 3 along the circumferential direction thereof. However, the fastening structure according to the present invention may not necessarily act on all of the fastening portions, and may act on only the fastening portion in which the strongest stress is produced (for example, the fastening portion $10_P$ at the end portion of the core plate segment 3). In addition, the plurality of fastening portions may not necessarily be formed in each of the core plate segments 3, and at least one fastening portion 10 may be formed in each of the core plate segments 3. That is, in the present embodiment, each of the core plate segments 3 includes the plurality of protruding portions 11 on one surface thereof, and the plurality of recessed portions 12 on the other surface, so that a number of the fastening portions 10 are formed. However, the core plate segment 3 may include at least one protruding portion 11 on one surface thereof, and at least one recessed portion 12 on the other surface.

Further, in the rotor core 1, joints between the core plate segments 3 in the core plate 2 in the circumferential direction C may only be reinforced using the core plates 2 of other layers in the entire rotor core 1. Therefore, the rotor core 1 may be configured so that the positions of the seams $D_1$, $D_2$ between the core plate segments 3 in the circumferential direction C differ from each other in the laminating direction of the core plates 2 for each layer of at least one of the core plates 2. For example, the rotor core 1 may be configured so that the positions of the seams $D_1$, $D_2$ between the core plate segments 3 in the circumferential direction C alternately differ from each other for every core plate. Alternatively, the positions of the seams $D_1$, $D_2$ may differ from each other for every set of the plurality of core plates, such as for every two core plates or for every three core plates.

Furthermore, the plurality of core plates 2 described above may be pressed all at once. In addition, the fastening structures described above may be used in any combination thereof. The fastening structures are also not limited to use in an IPM motor, and may, of course, be used in a rotor core for any type of rotary electric machine.

The present invention relates to a rotor core for a rotary electric machine, in which a plurality of core plates is laminated, and may be used for any rotary electric machine mounted in any type of product, for example, rotary electric machines that are mounted as drive sources in vehicles, such as passenger vehicles, buses, and trucks.

What is claimed is:
1. A rotor core for a rotary electric machine, comprising:
a plurality of ring-shaped core plates that are laminated to each other to form the rotor core, wherein
a layer of each of the core plates is formed by joining arc-shaped core plate segments formed by evenly dividing the core plate,
a position of a seam between the core plate segments in a circumferential direction differs in a laminating direction of the core plates for each layer of at least one of the core plates,
the core plate segments each include a protruding portion that is formed on one surface of each of the core plate segments and has an end portion in the circumferential direction that is arc-shaped, and a recessed portion that is formed on the other surface and has an end portion in the circumferential direction that is arc-shaped, and to which the protruding portion of the core plate segment of another layer is fitted when the core plates are laminated,
a width of the protruding portion in a radial direction of the core plates is larger than a width of the recessed portion in the radial direction of the core plates to fit the protruding portion into the recessed portion through an interference fit in the radial direction, and
a width of the protruding portion in the circumferential direction of the core plates is smaller than a width of the recessed portion in the circumferential direction of the core plates to fit the protruding portion into the recessed portion in the circumferential direction through a loose fit.

* * * * *